US008478768B1

(12) United States Patent
Pathak et al.

(10) Patent No.: US 8,478,768 B1
(45) Date of Patent: Jul. 2, 2013

(54) PRIVACY-PRESERVING COLLABORATIVE FILTERING

(75) Inventors: Manas Ashok Pathak, Pittsburgh, PA (US); Richard Chow, Sunnyvale, CA (US); Runting Shi, San Jose, CA (US); Cong Wang, Chicago, IL (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 13/314,748

(22) Filed: Dec. 8, 2011

(51) Int. Cl.
*G06F 7/00* (2006.01)
*G06F 17/30* (2006.01)

(52) U.S. Cl.
USPC ............................................ 707/757; 707/754

(58) Field of Classification Search
USPC ................................................ 707/757, 754
See application file for complete search history.

(56) References Cited

U.S. PATENT DOCUMENTS

| | | | |
|---|---|---|---|
| 7,006,999 B1* | 2/2006 | Huberman et al. | 705/50 |
| 8,261,069 B2* | 9/2012 | Bellovin et al. | 707/757 |
| 2009/0125517 A1* | 5/2009 | Krishnaswamy et al. | 707/10 |
| 2010/0131518 A1* | 5/2010 | Elteto et al. | 707/757 |
| 2010/0169342 A1* | 7/2010 | Kenedy et al. | 707/758 |
| 2011/0208763 A1* | 8/2011 | McSherry et al. | 707/757 |

OTHER PUBLICATIONS

Huseyin Polat and Wenliang Du, Privacy-Preserving Collaborative Filtering Using Randomized Perturbation Techniques. Department of Electrical Engineering and Computer Science, Syracuse University, Paper 18, Jan. 1, 2003. http://surface.syr.edu/eecs/18.*

Alexandr Andoni et al., "Near-optimal hashing algorithms for approximate nearest neighbor in high dimensions" Communications of the ACM, 51:117-122, 2008.
James Bennett et al., "The Netflix Prize" In KDD Cup and Workshop, 2007.
John Canny "Collaborative filtering with privacy", In IEEE Symposium on Security and Privacy, 2002.
John Canny "Collaborative filtering with privacy via factor analysis", In SIGIR, pp. 238-245, 2002.
Moses Charikar "Similarity estimation techniques from rounding algorithms" In 34th Annual ACM Symposium on Theory of Computing, 2002.
Abhinandan, Das et al., "Google news personalization: scalable online collaborative filtering", in WWW, pp. 271-280, 2007.
Cynthia Dwork "Differential privacy", In International Colloquium on Automata, Languages and Programming, 2006.
Craig Gentry "Fully homomorphic encryption using ideal lattices" In ACM Symposium on Theory of Computing, pp. 169-178, 2009.

(Continued)

*Primary Examiner* — Greta Robinson
*Assistant Examiner* — Brian E. Weinrich
(74) *Attorney, Agent, or Firm* — Shun Yao; Park, Vaughan, Fleming & Dowler LLP

(57) ABSTRACT

A recommender system can generate a predicted item rating for one user by performing collaborative filtering on item ratings from other users. The recommender system can include a client device that interfaces with a server to obtain a predicted item rating for a local user. The client device can generate a standardized ratings vector for the user, and computes a group identifier for the user based on the standardized ratings vector. The system also generates a noisy ratings vector for the local user, and sends a user-ratings snapshot to a recommendation server that includes the group identifier and the noisy ratings vector. The recommender system can also include the recommendation server that generates a predicted item rating for the user by performing collaborative filtering on ratings vectors from a plurality of other users that belong to the same ratings group.

18 Claims, 8 Drawing Sheets

OTHER PUBLICATIONS

David Goldberg et al., "Using collaborative filtering to weave an information tapestry", Communications of the ACM, 35:61-70, 1992.

Thomas Hoffman "Latent semantic models for collaborative filtering", ACM Transactions on Information Systems, 22(1): 89-115, 2004.

Neil Hunt "Netflix prize update", http://blog.netflix.com/2010/03/this-is-neil-hunt-chief-product-officer.html.

Ashwin Machanavajjhala et al., "l-diversity: Privacy beyond k-anonymity", ACM Transactions on Knowledge Discovery from Data, 1(1), 2007.

Frank McSherry et al., "Differentially private recommender systems: Building privacy into the Netflix prize contenders", In KDD, pp. 627-636, 2009.

Koji Miyahara et al., "Collaborative filtering with the simple Bayesian classifier", In PRICAI, pp. 679-689, 2001.

Animesh Nandi et al., "P3: A privacy preserving personalization middleware for recommendation-based services", In Hot Topics in Privacy Enhancing Technologies Symposium, 2011.

Arvind Narayanan et al., "Roboust de-anonymization of large sparse datasets" In IEEE Symposium on Security and Privacy, pp. 111-125, 2008.

Huseyin Polat et al., "Achieving private recommendations using randomized response techniques", in PAKDD '06, pp. 637-646, 2006.

Elaine Shi et al., "Privacy-preserving aggregation of time-series data", In NDSS, 2011.

Ryan Singel "Netflix Spilled Your Brokeback Mountain Secret", Lawsuit Claims, http://www.wired.com/threatlevel/2009/12/netflix-privacy-lawsuit/.

Netflix Prize, http://en.wikipedia.org/wiki/netflix_prize.

Xiaoyuan Su et al., "A survey of collaborative filtering techniques", Advances in Artificial Intellegence, 2009.

* cited by examiner

US 8,478,768 B1

PRIVACY-PRESERVING COLLABORATIVE FILTERING

BACKGROUND

1. Field

This disclosure is generally related to recommender systems. More specifically, this disclosure is related to using encoded or obfuscated ratings information to perform collaborative filtering.

2. Related Art

Online services often use recommender systems to predict items that a user is likely to be interested in, or to predict how the user is likely to rate the item. These recommender systems can improve the user's experience as he visits an online retailer, searches for a streaming movie to watch, or otherwise peruses any other type of user-rated online content. The accuracy of a recommender system can allow the online service to present the user with items that the user is likely to be interested in, but oftentimes at the cost of sacrificing the user's privacy.

Through recommender systems, the user exchanges a transcript of his purchasing and rating history to get relevant recommendations for items such as movies, restaurants, books, hotels, travel, and the like. In practice, recommender systems can have a sparse dataset of rating information (e.g., a movie rating dataset from Netflix, Inc.), where individual users often provide a rating for less than 1% of all items. These ratings are often related to items that the user is interested in. Therefore, because it can be common for a user to not have rated an item, the recommender system can obtain sensitive information about the user based on the items purchased or rated by the user. The recommender system may be able to infer sensitive information about the user based on the types of items the user has rated, and their rating values (e.g., types of movies the user has watched and liked or disliked).

Moreover, the recommender system can perform collaborative filtering to make a recommendation for the user based on the assumption that the users who agreed in the past are likely to agree in the future. Thus, the recommender system can make sensitive inferences about the user based on the purchasing or rating behavior made by other users that have agreed with this user in the past.

Unfortunately, recommender systems do not implement sufficient safeguards to protect the user information in the case that the user's purchasing and rating information is released unintentionally. For example, if the recommender system becomes compromised (e.g., by a malicious user or a government subpoena), the malicious user is able to expose the user's preferences from the purchasing and ratings behavior. Further, the malicious user can use the ratings information for a plurality of users to infer, with a high probability, how each user is likely to rate other items.

SUMMARY

One embodiment provides a recommender system that interfaces with a server to obtain a predicted item rating for a local user without revealing the local user's actual ratings information. The system includes a client device that generates a standardized ratings vector using a plurality of user-selected ratings from the local user, and computes a group identifier for the local user by processing the standardized ratings vector using a group-identifying hash function. The plurality of user-selected ratings can correspond to a plurality of items rated by the local user, and the standardized ratings vector is standardized based on a rating average for the local user. The system also generates a noisy ratings vector for the local user, so that the noisy ratings vector includes the plurality of user-selected ratings and also includes a plurality of random-generated ratings. The system then sends a user-ratings snapshot to a recommendation server, such that the user-ratings snapshot includes the group identifier and the noisy ratings vector.

In some embodiments, the system can generate the plurality of random-generated ratings so that a computed average of the random-generated ratings matches the local user's rating average. Further, the plurality of random-generated ratings can correspond to items not rated by the local user.

In some embodiments, the system can determine a recommendation for the local user by sending a recommendation request to the recommendation server, such that the recommendation request indicates the group identifier or a unique identifier for the local user. The system then receives a recommendation for the local user. The recommendation can indicate a predicted rating for an item.

In some embodiments, the group-identifying hash function includes a locality-sensitive hash function that takes k orthogonal vectors and the standardized ratings vector as input, and produces a k-bit hash result.

In some embodiments, the system can generate a local-user public key corresponding to the local user, and can send the local-user public key to a trusted key-exchange server. The system can also receive a remote-user public key corresponding to a remote user, and generates a private key based on the local-user public key and the remote-user public key. Then, the system can encrypt the k-bit hash result from the group-identifying hash function using the private key to produce the group identifier.

One embodiment provides a recommender system that generates a predicted item rating for a local user by performing collaborative filtering on item ratings from other users. The system includes a recommendation server that receives a user-ratings snapshot from a client device for a first user. The user-ratings snapshot comprises a first group identifier for the first user and a first ratings vector for the first user. Also, the ratings vector indicates a rating value for each of a plurality of rated items. The system then associates the first ratings vector to a ratings group identified by the first group identifier.

The system can also receive a recommendation request indicating a second group identifier for a second user, such that the second group identifier identifies the ratings group. The system can select a plurality of ratings vectors associated with the ratings group, and can generate a recommendation based on the plurality of ratings vectors.

In some embodiments, the system can generate the recommendation by computing, from the plurality of ratings vectors of the ratings group, an average rating for one or more rated items. The system then selects an item that has the highest average rating among the one or more rated items.

In some embodiments, the system can compute an average rating for an item within a ratings group by first computing a standardized average rating for the item from the plurality of ratings vectors in the ratings group. The system then computes the average rating for the item by adding the second user's average rating to the standardized average rating.

The system can compute the standardized average rating for the item by computing the average for a plurality of standardized ratings, such that each standardized rating corresponds to a different user of the ratings group. Further, a standardized rating for a third user is standardized based on a rating average for the third user.

In some embodiments, the ratings group is identified by a plurality of encrypted group identifiers. Further, the first and second group identifiers can each comprise a group identifier that has been encrypted using a shared key corresponding to the first and second users. The system can determine that the second user is associated with the ratings group by determining that the second group identifier matches at least the first group identifier.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of generating an item recommendation for a user without revealing the user's item-rating behavior by providing a recommender system that uses an encoding of the user's item-rating information to group the user along with other users that have similar item-rating behavior. Specifically, a client device of the recommender system encodes the user's item-rating information to generate a group identifier for the user, and adds noise to the item-rating information before sending the noisy item-ratings information to a recommendation server.

Thus, a plurality of users can contribute their item-rating information to the recommender system in a way that allows the recommender system to generate meaningful item recommendations, but does not allow the recommendation server to infer which items a certain user has rated. These users can participate in the collaborative filtering of item recommendations, without having to trust the recommendation server with their item-rating information.

The recommender system can correspond to two types of systems, an open system or a closed system:

Open System The user's client device can request an item recommendation from an untrusted server. In the open system, the recommendation server can manage the number of participating users, and can store noisy ratings information for these users. The open system is applicable to general recommendation applications (e.g., a Web service).

Closed System: A restricted number of users that belong to a trusted organization request an item recommendation from an untrusted server. In the closed system, the recommendation server does not control the set of participating users. The number of users can be managed by the trusted organization, such as a corporate network consisting of employees. These users can use a third-party recommendation service to obtain an item recommendation.

Exemplary Computing Environment

Figure 1:
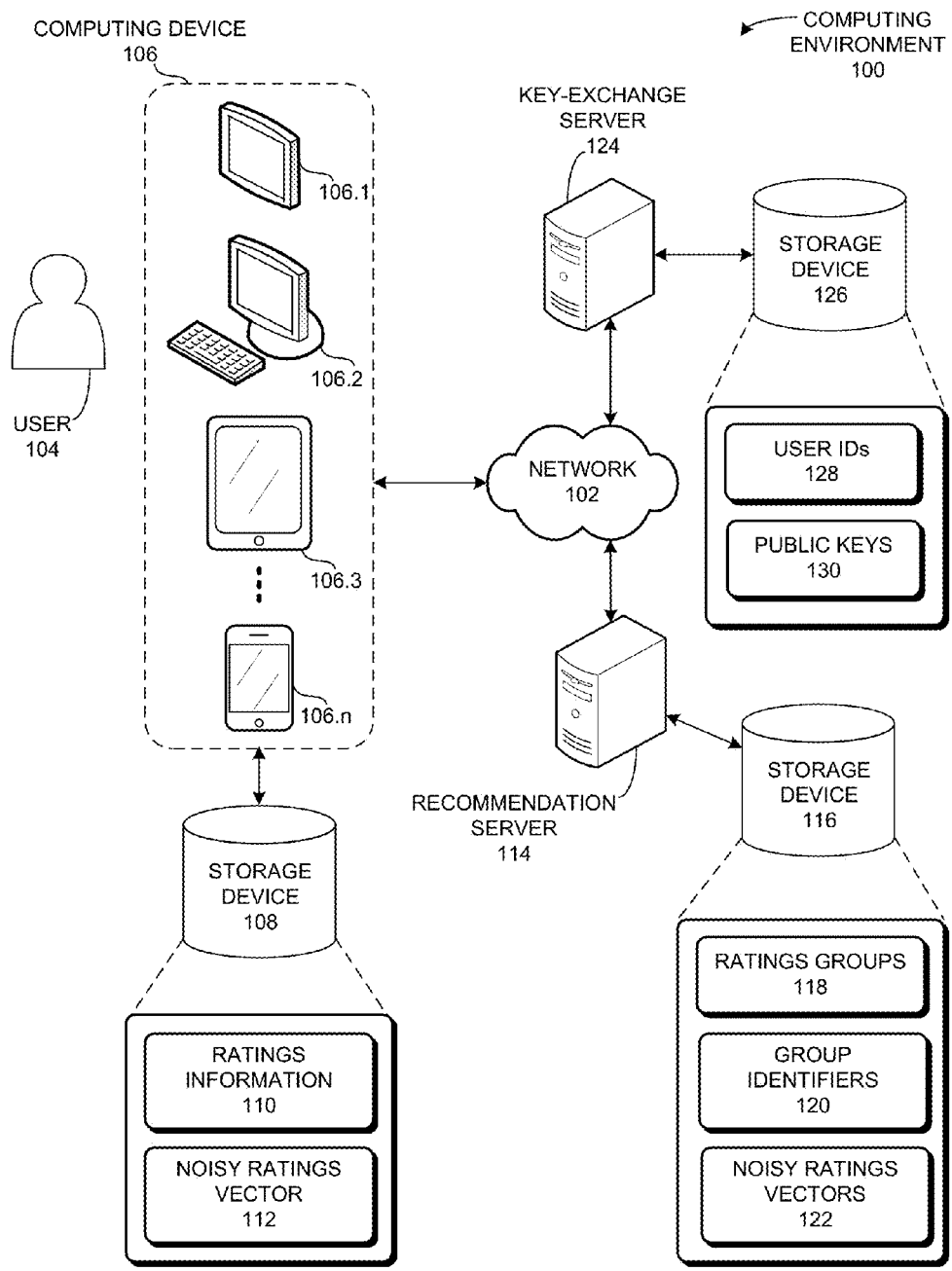
FIG. 1 illustrates an exemplary computing environment for generating an item recommendation in accordance with an embodiment.

FIG. 1 illustrates an exemplary computing environment 100 for generating an item recommendation in accordance with an embodiment. Computing environment 100 can include a computing device 106 for a user 104, and can include a recommendation server 114. Computing device 106 can include any computing device coupled to network 102 that can receive item ratings from user 104, or present item and ratings recommendations for user 104. For example, computing device 106 can include an Internet-enabled television 106.1, a computer system 106.2, a tablet computing device 106.3, or any portable computing device such as a mobile phone 106.n.

Further, computing device 106 can include a storage device 108 that can store ratings information 110 and a noisy ratings vector for user 104. Ratings information 110 can include ratings from user 104 for a plurality of items, such as movies, books, music, and/or any other type of merchandise or content. Noisy ratings vector can include item ratings from ratings information 110, and can also include random-generated (fake) item ratings. The fake ratings in the noisy ratings vector protect ratings information 110 by giving user 104 plausible deniability that he has indeed created an item rating of noisy ratings vector 112.

Recommendation server 114 can include any computing device coupled to network 102. Further, recommendation server 114 can include a storage device 116, which can store ratings groups 118, group identifiers 120, and noisy ratings vectors 122. Recommendation server 114 can receive noisy ratings vectors 122 from a plurality of users, and assigns a user's ratings vector to a ratings group that corresponds to the user's group identifier. Further, recommendation server 114 can generate a recommendation for user 104 by computing, from a plurality of noisy ratings vectors 122 of the ratings group, a predicted rating for one or more items.

In some embodiments, computing environment 100 implements an open system where computing device 106 provides a group identifier that indicates a ratings group to recommendation server 114. Recommendation server 114 can use the group identifier directly to assign user 104 to a ratings group indicated by the group identifier. The matching ratings group includes other users with similar item-ratings behavior to user 104.

In some other embodiments, computing environment 100 implements a closed system where the group identifier is encrypted, and so recommendation server 114 assigns user 104 to a ratings group by matching the encrypted group identifier to that of another user in the ratings group. This prevents recommendation server 114 from inferring ratings behavior about user 104 from the group identifier's value.

Client device 106 participates in the closed system by generating a public key for user 104, and exchanging public keys with other users via a trusted key-exchange server 124. Client device 106 uses the exchanged public keys to generate a plurality of shared keys (e.g., one shared key for each remote user), and encrypts the group identifier for user 104 using each of these shared keys. Thus, client device 106 can send a plurality of encrypted group identifiers to recommendation server 114, and recommendation server 114 can perform pair-wise matching of encrypted group identifiers for different users to assign users with matching keys into a common ratings group. Key exchange server 124 can include a storage device 126 that stores user identifiers 128 that correspond to a plurality of users that participate in an item recommendation service, and can store public keys 130 corresponding to these users.

Figure 2:
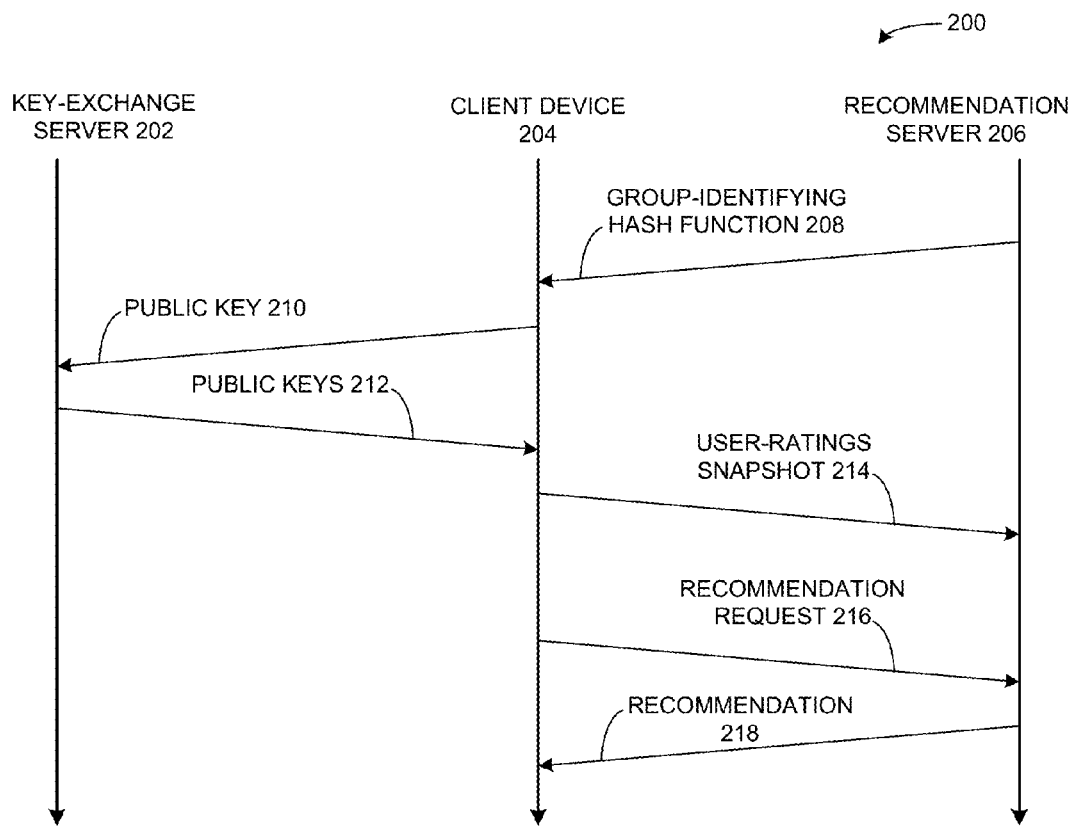
FIG. 2 illustrates an exemplary communication between a client device and a recommendation server in accordance with an embodiment.

FIG. 2 illustrates an exemplary communication 200 between a client device 204 and a recommendation server 206 in accordance with an embodiment. During operation, client device 204 can receive a group-identifying hash function 208 from recommendation server 208. Client device 204 can use group-identifying hash function 208 to generate a group identifier for a user based on a standardized ratings vector corresponding to the user's ratings information. Client device 204 can then register the user with recommendation server 206 by sending a user-ratings snapshot 214 to recommendation server 206. User-ratings snapshot 214 can include the noisy ratings vector, and can include the group identifier. Recommendation server 206 can determine a group of users that have similar ratings behavior to the user based on the group identifier, and associates the user (and his noisy ratings vector) with a ratings group that includes these other users.

In some embodiments, client device 204 can participate in a closed system where the hash result from group-identifying hash function 208 (e.g., the group identifier) is not revealed to recommendation server 206. In the closed system, client device 204 can generate shared keys corresponding to other remote users, and can use these shared keys to generate a plurality of encrypted group identifiers. Each encrypted group identifier is encrypted using a shared key corresponding to a different remote user. Further, client device 204 can send the encrypted group identifiers to recommendation server 206 along with user-ratings snapshot 214.

Client device 204 exchanges public keys with the remote users by generating a public key 210 for the user, and sending public key 210 to a trusted key-exchange server 202. Then, client device 204 receives public keys 212 corresponding to the remote users from key-exchange server 202, and generates the shared keys corresponding to the remote users based on public keys 210 and 212.

In some embodiments, client device 204 can send a recommendation request 216 to recommendation server 206. Recommendation request 216 can include the group identifier for the local user, or can include a unique identifier corresponding to the local user. Further, recommendation server 206 can respond to recommendation request 216 by generating an item recommendation 218 for the local user, and sending recommendation 218 to client device 204. If recommendation request 216 indicates one or more items, recommendation 218 can include predicted ratings for these items. Otherwise, recommendation 218 can include one or more recommended items that recommendation server 206 predicts that the local user is likely to rate highly. It may be possible that recommendation 218 can include a recommendation for one or more items that the user has already rated, given that recommendation server 206 does not know for certain which items the user has actually rated. In some embodiments, client device 204 can process recommendation 218 to remove a recommendation for an item that the user has already rated.

Locality Sensitive Hashing

Locality-sensitive hashing (LSH) provides a method to perform probabilistic dimension reduction of high-dimensional data. The system performs LSH by hashing the vector entries in x using specially-designed locality-sensitive hash functions that ensure the collision probability is much higher for similar data points (e.g., numerical values whose difference is within a determinable amount) than for those that are far away. In some embodiments, LSH can be defined over a cosine distance, a Euclidean distance, a Hamming distance, or any other distance metric now known or later developed.

The cosine distance metric can be represented by the angle between the two vectors x and y:

$$\Theta(x, y) = \cos^{-1}\left(\frac{x \cdot y}{\|x\| \cdot \|y\|}\right) \qquad (1)$$

In some embodiments, the LSH family F is defined as follows. The hash function $L_i[\bullet]$ computes a hash result based on an n-dimensional random vector $r_i$, where each vector entry in $r_i$ is obtained from the Gaussian distribution N(0,1) independently. Given an n-dimensional input vector q, the hash function $L_i[\bullet]$ generates the hash result:

$$L_i(q) = \begin{cases} 1 & \text{if } r_i \cdot q \geq 0 \\ 0 & \text{if } r_i \cdot q < 0 \end{cases} \qquad (2)$$

Hash function $L_i[\bullet]$ divides the entire vector input space by a hyperplane represented by the vector $r_i$, and any two vectors lying on the same side of the hyperplane defined by $r_i$ hash to the same value. Thus, the likelihood of two vectors x and y hashing to the same LSH value depends on their cosine similarity:

$$p = Pr[L_i(x) = L_i(y)] = 1 - \frac{\Theta(x, y)}{\pi} \qquad (3)$$

Given that one hash function $L_i[\bullet]$ from the family does not give accurate enough results for the locality sensitive hash, the system uses a set of k hash functions $L[x]=L_1[x], L_2[x], \ldots, L_k[x]$. The system computes the final hash result by concatenating the individual hash results for the k hash functions in $L[\bullet]$. Thus, the k-bit LSH function, $L[\bullet]$, maps an n-dimensional vector x into a k-bit string.

Client Computing Device

In some embodiments, the recommender system includes a client computing device that stores sensitive item-rating information for a local user, and interfaces with a recommendation server to obtain a suggested rating for an item. Only the local user can view the item-rating information stored by the client device. Further, the local user's client device can communicate with the recommendation server to provide noisy item-ratings information, and to request an item recommendation.

The client device does not need to send the raw (unobscured) item-rating information to the recommendation server, or to client devices belonging to other users. This provides a privacy safeguard for the local user, because the user's privacy is not violated if the recommendation server releases the item-ratings information (e.g., due to a hacking attack, or a release due to a legal requirement).

Figure 3:
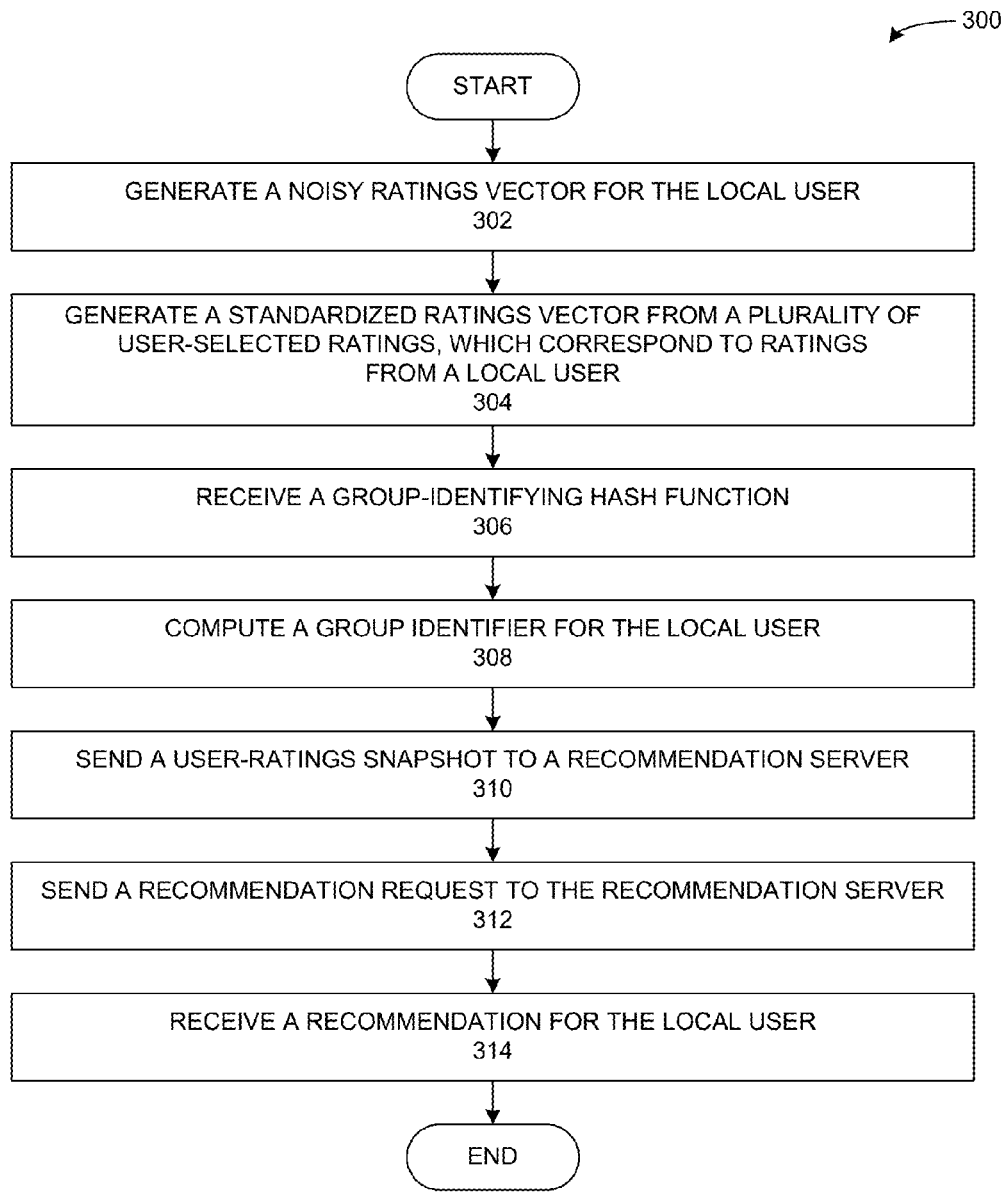
FIG. 3 presents a flow chart illustrating a method for interacting with a recommendation server to obtain a recommended item in accordance with an embodiment.

FIG. 3 presents a flow chart illustrating a method 300 for interacting with a recommendation server to obtain a recommended item in accordance with an embodiment. During operation, the system can generate a noisy ratings vector for the local user (operation 302).

In some embodiments, the system can generate the noisy ratings vector so that it includes the user-selected item-ratings, and it also includes a plurality of random-generated item-ratings. For example, the system can generate the plurality of random-generated item-ratings based on a determinable parameter (e.g., as a number of fake item-ratings, or as a percentage of the user's item-ratings). In some variations, the system can generate a number of random-generated item-ratings so that it is equal to the number of item-ratings indicated by the user. Therefore, based on the noisy ratings vector, the recommendation server can only determine that a user has watched a rated movie with probability 0.5.

Further, the system can generate a standardized ratings vector from the plurality of user-selected ratings (operation 304). The standardized ratings vector accounts for how the user is likely to rate items higher or lower relative to other users. The system can generate the standardized ratings vector by subtracting the user's average rating value from the individual item ratings. Thus, for a user u with ratings $r_u = \{r_{u,1}, \ldots, r_{u,m}\}$, and an average rating $\bar{r}_u$, the system computes the standardized ratings $\hat{r}_u$:

$$\hat{r}_u = \{\hat{r}_{u,1}, \ldots, \hat{r}_{u,m}\} = \{r_{u,1} - \bar{r}_u, \ldots, r_{u,m} - \bar{r}_u\}. \quad (4)$$

Next, the system receives a group-identifying hash function, L[•], from a recommendation server (operation 306), and generates a group identifier for the user using the group-identifying hash function (operation 308). In some embodiments, the group-identifying hash function L[•] can be a locality-sensitive hashing (LSH) function. Thus, the system can use the LSH function to generate a k-bit hash result L[$\hat{r}_u$] based on the standardized ratings vector $\hat{r}_u$ for the local user u. Further, in some embodiments, the system can evaluate the LSH function L[•] over the local user's standardized ratings vector $\hat{r}_u$ by performing a matrix-vector multiplication between k orthogonal vectors (which implement k hyperplanes for the LSH function L[•]) and the ratings vector $\hat{r}_u$.

The k-bit hash result L[$\hat{r}_u$] indicates a ratings group for the user u, and may satisfy a strong l-diversity property. That is, for a plurality of users that map to a certain ratings group, there is large diversity in the sets of items that are rated by each user of the ratings group. Thus, for any item, a user's membership to a certain ratings group does not provide strong evidence that the user has actually rated the item.

In some embodiments, the recommendation server can determine a group identifier for the user based on the user's noisy ratings vector. This can reduce the computation load of the client device, and can provide a stronger privacy guarantee. However, determining a user's ratings group based on the noisy ratings vector reduces the accuracy of the recommended items.

The system can then send a user-ratings snapshot to the recommendation server (operation 310). This user-ratings snapshot can include the noisy ratings vector, and can include the group identifier. The recommendation server can determine a group of users that have similar ratings behavior to the user based on the group identifier, and associates the user with a ratings group that includes these other users.

In some embodiments, the system can send a recommendation request to the recommendation server (operation 312), and can receive an item recommendation for the local user (operation 314). The recommendation request can include a unique identifier (UID) for the user, or can include the group identifier (GID). The recommendation server can determine a ratings group corresponding to the user based on the UID or GID, and can generate a recommendation for the user based on the ratings behavior of the users within this group.

Recall that in a closed recommender system, the number of users is restricted by a central organization (e.g., a system administrator within an organization), and the recommendation server is not trusted with the hash results that indicate a user's ratings group. Thus, in some embodiments, the system can generate and upload encrypted group identifiers to the recommendation server, which prevents the recommendation server from using a group identifier's hash result to make inferences on a user's item-ratings. While this encryption and uploading processes can be computationally expensive, the system can perform this operation periodically (e.g., monthly or yearly). For example, the system can perform this operation when registering the user with the recommendation server to determine a ratings group for the user. Once the user is assigned a ratings group, the recommendation server can provide recommendations to the user without having to receive a user-ratings snapshot from the user.

Figure 4:
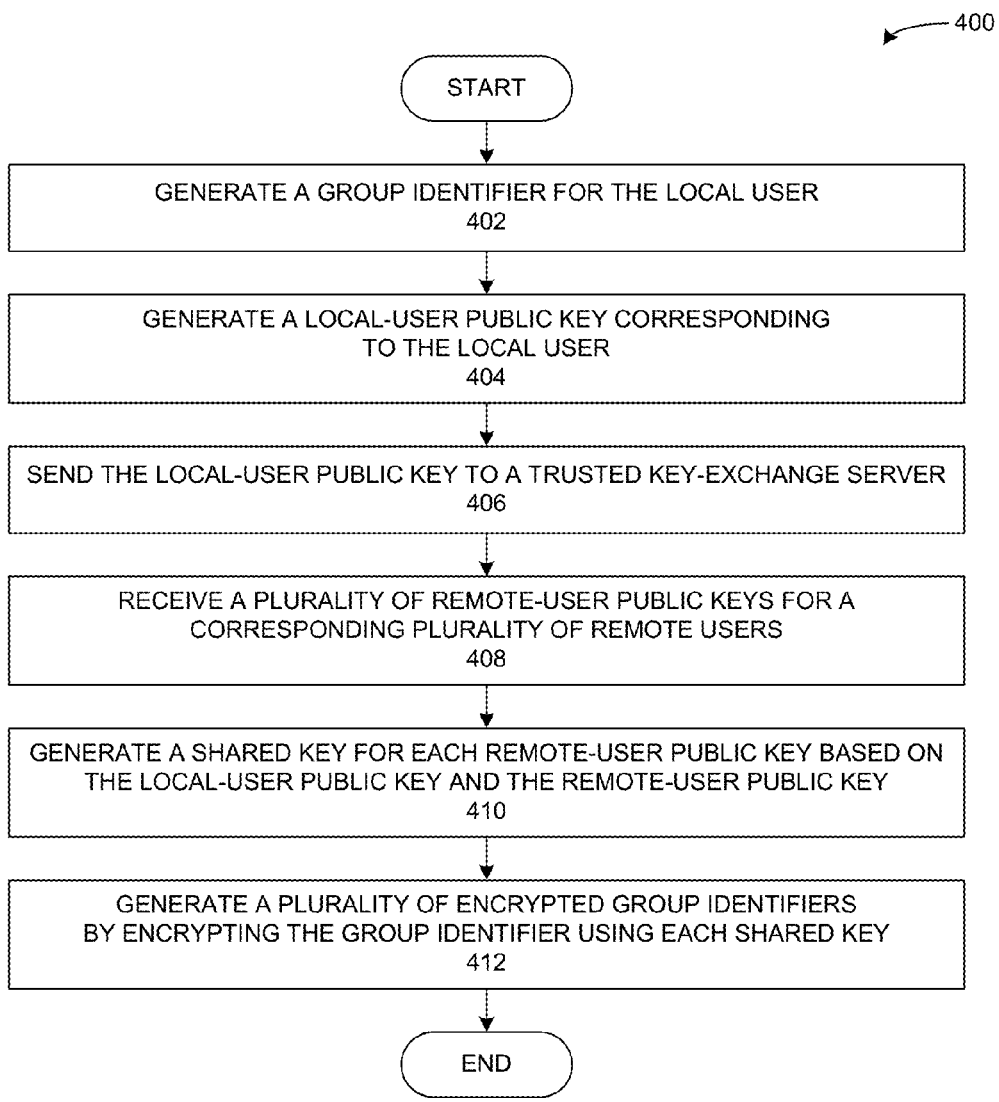
FIG. 4 presents a flow chart illustrating a method for generating a plurality of encrypted group identifiers corresponding to other client devices for a recommendation server in accordance with an embodiment.

FIG. 4 presents a flow chart illustrating a method 400 for generating a plurality of encrypted group identifiers corresponding to other client devices for a recommendation server in accordance with an embodiment. During operation, the system generates a group identifier for the local user (operation 402). For example, the system can use the group-identifying hash function L[•] obtained from the recommendation server to generate the k-bit hash result L[$\hat{r}_u$] based on the standardized ratings vector $\hat{r}_u$ for the local user u.

The local user's system can receive a generator element, g, and a prime number, p, from a trusted key-exchange server, and the system generates a local-user public key for the local user based on the values g and p (operation 404). The trusted key-exchange server can create the finite cyclic group $Z_p^*$ so that it has a size of 1024-bits. Further, to generate the public key, the system can generate a random number $s_u \in Z_p^*$ for the local user, u, and computes the public key $g^{s_u}$ mod p. The system then sends the local-user public key to the trusted key-exchange server (operation 406).

Next, the system receives a plurality of remote-user public keys for a corresponding plurality of remote users (operation 408). The plurality of remote-user public keys can include the set $\{g^{s_1} \bmod p, \ldots, g^{s_n} \bmod p\}$, where n indicates the number of remote users. Next, the system generates a shared key for each remote-user public key based on the local-user public key and the remote-user public key (operation 410). For each remote-user public key $g^{s_i}$, $i \neq u$, in the plurality of remote-user public keys $\{g^{s_1} \bmod p, \ldots, g^{s_n} \bmod p\}$, the local user, u, computes the shared key $(g^{s_i})^{s_u}$ mod p.

The system then generates a plurality of encrypted group identifiers by encrypting the group identifier from operation 402 using each shared key (operation 412). For a remote user $i \neq u$, the system can generate the encrypted group identifier:

$$g^{s_u s_i + L[\hat{r}_u]} \bmod p = (g^{s_i})^{s_u} g^{L[\hat{r}_u]} \bmod p.$$

Here, $s_u$ indicates the local user's random number, and L[$\hat{r}_u$] indicates the group identifier (e.g., the hash result from the group-identifying hash function L). Thus, a ratings group of the recommendation server can include users that share the same encrypted group identifier in a pair-wise manner. For example, for three users u, v, w, all these three users are clustered into the same ratings group if:

$$g^{s_u s_v + L[\tilde{r}_u]} = g^{s_v s_u + L[\tilde{r}_v]}, \text{ and } g^{s_u s_w + L[\tilde{r}_u]} = g^{s_w s_u + L[\tilde{r}_w]}.$$

The system then sends the plurality of encrypted group identifiers to the recommendation server ($\{g^{s_u s_i + L[\tilde{r}_u]}\}$, for i≠u), for example, by including the plurality of encrypted group identifiers in the user-ratings snapshot (e.g., during operation 310) to register the user with the recommendation server.

Generating a Noisy Ratings Vector

Recall that the recommender system can generate the noisy ratings vector so that it includes the user-selected item-ratings, and it also includes a plurality of random-generated (fake) item-ratings. The system can configure the ratio of the number of fake item-ratings to the number of user-selected item-ratings based on a system parameter (e.g., based on a desired tradeoff between accuracy and user-privacy). A higher ratio increases the user's privacy (e.g., increases the user's deniability that he has provided the rating for a rated item). For example, a noisy ratings vector can include N user-selected item-ratings, and can include M fake item-ratings, where N+M<<m, where m indicates the total number of items. Thus, for a rated item, the recommendation server can only conclude that the user has rated this item with probability N/(N+M).

In some embodiments, the system generates the noisy ratings vector so that N+M≧80 to ensure that the set of rated movies returned to the server belongs to a large space that is impractical to iterate over. This makes it difficult for a malicious entity to determine the user's ratings by iterating over the noisy ratings vector, and selecting rating subsets to generate an LSH hash result (e.g., to determine a group identifier). If the hash result matches the user's group identifier, the malicious entity can conclude that the selected ratings from the noisy ratings vector correspond to the user-selected item-ratings. Thus, if N+M is large, it would be impractical for the malicious user to attempt every subset of item ratings from the noisy ratings vector.

In some embodiments, the system selects the plurality of fake item-ratings uniformly over the range [1, 5]. In some other embodiments, the system selects a pseudo-random item-rating so that the plurality of fake item-ratings preserves the average user-selected item-rating. The system can compute the user's true average $\bar{r}_u$,d and can select the fake item-rating from $N(\bar{r}_u, 1)$, rounding to the nearest item-rating in (1, . . . , 5).

The techniques used to obfuscate the user's actual ratings impacts the amount of information that can be determined from the noisy ratings vector. For example, if an item-rating of the noisy ratings vector is set to 0, then the server can conclude that the user didn't rate this item. If an item rating of the noisy ratings vector has a non-zero value, then the server can guess that the user has rated this item with probability N/(N+M). However, for popular items (e.g., a popular movie in a set of movie ratings), it may be more likely that the rating is not fake.

In some embodiments, the system can use additional techniques to generate the noisy ratings vector. For example, the system can set the rating for a randomly-selected fraction of rated items to the 0 rating (e.g., to consider these items as not rated). This introduces plausible deniability for items not rated, and provides the recommendation server with an uncertainty as to whether an item has, or has not, been rated (e.g., it becomes difficult to determine whether the user has, or has not, seen a certain movie).

Recommendation Server

In some embodiments, a recommendation server of the recommender system can receive item-rating information for m items (e.g., movies), from n users. Oftentimes, users provide ratings for a small subset of the m items. Each item rating can indicate a numeric value, for example, in the range [0, 5], where a rating value of 0 for an item indicates that the user has not rated the item. Thus, the recommendation server can include item-rating information that consists of a user-by-item matrix of ratings. The recommendation server performs collaborative filtering to predict how a user is likely to rate an item that the user has not yet rated. An item-ratings vector for a user is denoted by r, and users are denoted by suffixes u and v. Further, items are denoted by suffixes i and j. For example, the rating of user u for an item i is denoted by $r_{u,i}$. Also, the set of all ratings of a user u is denoted by $r_u$, and the set of all ratings for an item i is denoted by $r_i$.

Figure 5:
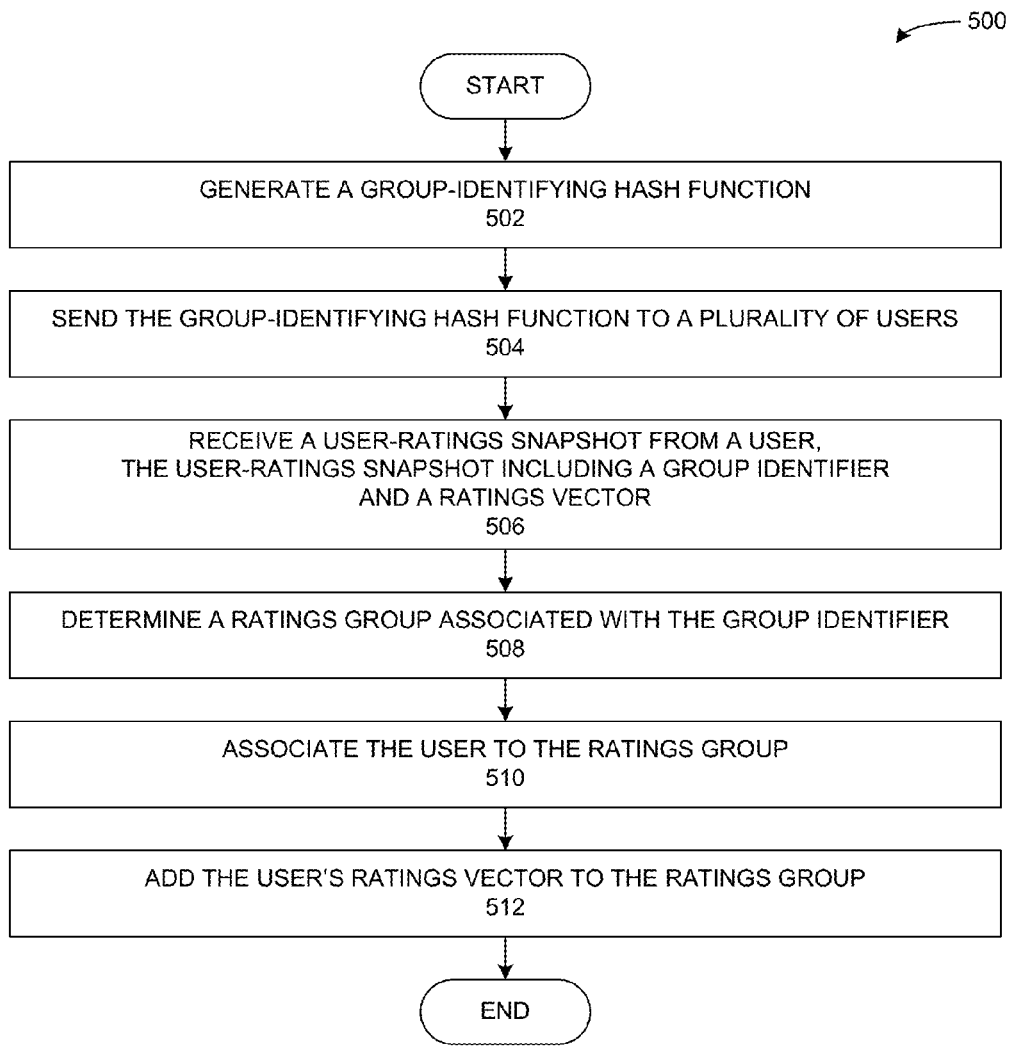
FIG. 5 presents a flow chart illustrating a method for determining a ratings group for a user in accordance with an embodiment.

FIG. 5 presents a flow chart illustrating a method 500 for determining a ratings group for a user in accordance with an embodiment. During operation, the system can generate a group-identifying hash function L[•](502), and sends the group-identifying hash function to a plurality of users (operation 504). The system can generate the hash function L[•] as follows. The system can generate k random vectors, such that each vector includes m random values. Then, the system can apply the Gram-Schmidt process to verify that the k vectors are orthogonal. The system can normalize the vectors to be unit length, and verifies that there is no vector entry larger than a determinable upper bound (e.g., 0.03). If the system determines that a vector entry is larger than 0.03, the system can replace this vector with another random vector that is orthogonal to the other vectors, and normalizes this vector to be unit length.

These k random vectors partition the entire vector space by the hyperplanes defined by these vectors. For example, if k=8, the orthogonal vectors of the hash function L[•] partitions the space of ratings vectors into 256 ratings groups, such that users in the same group have the same hash result and thus are considered similar. Choosing the k random vectors to be orthogonal reduces the variance of the group sizes, and can increase the overall accuracy for a predicted item rating.

After sending the group-identifying hash function to the users, the system can receive a user-ratings snapshot from a user (operation 506). The user-ratings snapshot can include a group identifier corresponding to the user, and can include a ratings vector that indicates the user's rating behavior (e.g., item preferences). In some embodiments, the ratings vector can correspond to a noisy ratings vector, where the user's client device has inserted random rating values, and/or has removed randomly selected ratings. Further, the system can compute the average rating for each user based on the noisy ratings vector.

The system can then determine a ratings group associated with the group identifier (operation 508), and associates the user to the ratings group (operation 510). Further, the system can add the user's ratings vector to the ratings group (operation 512).

Privacy Loss from the Group Identifier's Hash Result

In some embodiments, the group-identifying hash function impacts how much rating information can be derived from the group identifier (the hash result). For larger k-values, the system can map a plurality of users into a larger quantity of ratings groups, where a k-bit hash result can map the local users into a ratings group corresponding to other users with closer ratings vectors. Thus, there can be a loss of privacy if a malicious entity can infer one user's item ratings from that of another user in the ratings group, which can happen when few users are mapped to a certain ratings group.

Consider the information provided by the first bit of the hash result. A suboptimal random vector for this bit of the LSH hash function can correspond to a hyperplane that is aligned with a certain coordinate axis, such that this coordinate axis can represent a particular item (e.g., a movie). Thus, this bit can be 0 if the user's standardized rating for this item is less than 0, and can be 1 otherwise. In other words, if the random vectors are not chosen carefully, one bit of the hash result can encapsulate precise information about whether the user rated a certain item at above or below his average rating.

In some embodiments, the system selects the random vectors of the LSH function so that each bit of the hash result corresponds to a hyperplane that represents a large plurality of items. For instance, the unit normal vector has vector elements whose maximum magnitude is 0.03 along any coordinate axis (along any individual item), and is usually much less. This limits the amount by which any individual item influences a certain bit of the hash result, which in turn minimizes the inference that can be made about any particular item rating.

Figure 6:
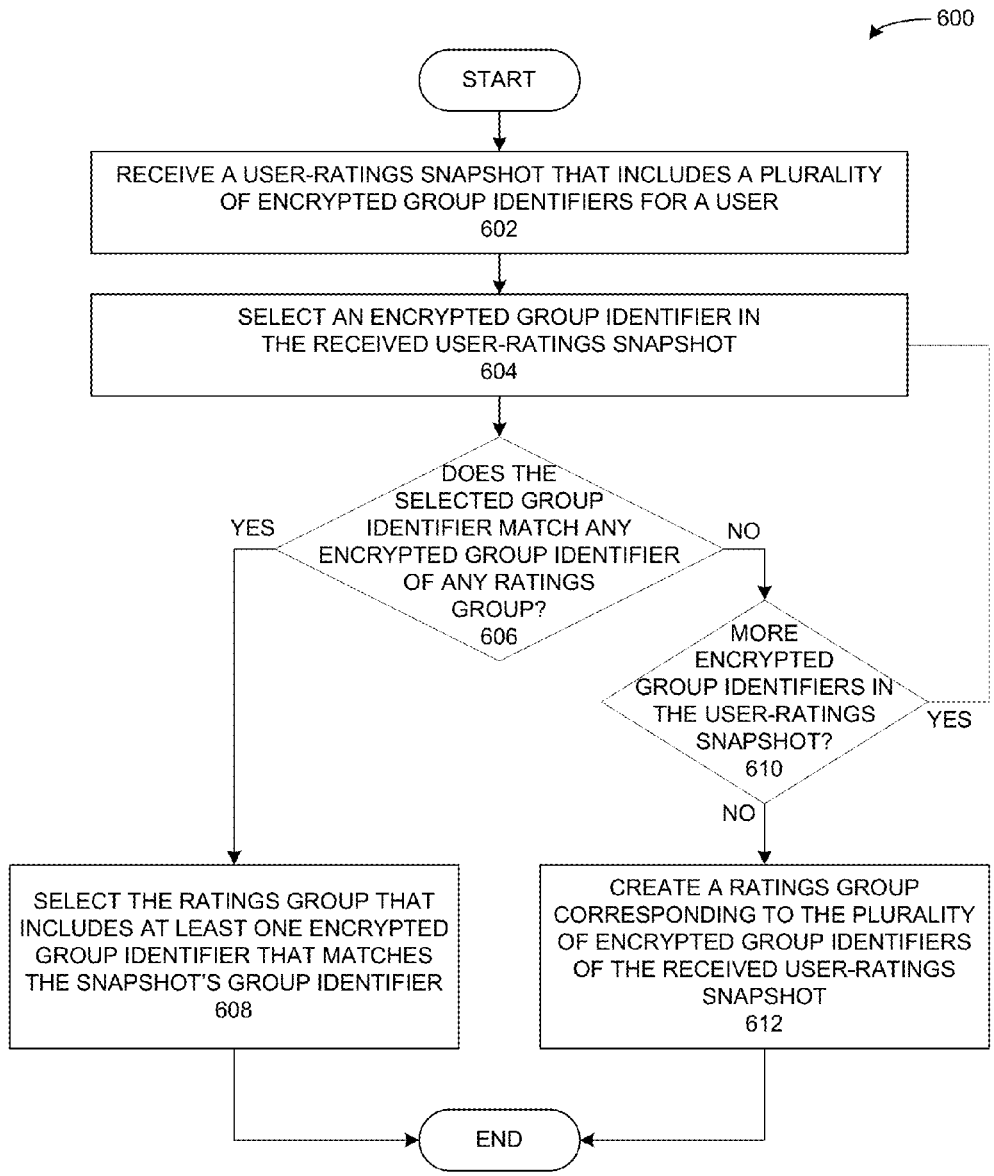
FIG. 6 presents a flow chart illustrating a method for selecting a ratings group corresponding to a user's user-ratings snapshot in accordance with an embodiment.

FIG. 6 presents a flow chart illustrating a method 600 for selecting a ratings group corresponding to a user's user-ratings snapshot in accordance with an embodiment. During operation, the system can receive a user-ratings snapshot that includes a plurality of encrypted group identifiers for a user (operation 602). Recall that in the closed system, the recommendation server can associate a plurality of encrypted group identifiers for each user to a ratings group. The user generates an encrypted group identifier using a shared key corresponding to another user so that their corresponding group identifiers can be compared directly without revealing any characteristics to their individual rating behavior.

Thus, the system can determine a ratings group for the user by matching at least one encrypted group identifier from the user to at least one encrypted group identifier of a ratings group. For example, the system can select an encrypted group identifier in the received user-ratings snapshot (operation 604), and determines whether the selected group identifier matches any encrypted group identifier of any ratings group (operation 606). If so, the system selects the ratings group that includes at least one encrypted group identifier matching the selected group identifier (operation 608).

In some embodiments, it is possible that the encrypted group identifier selected from the user-ratings snapshot does not match any encrypted group identifier for any ratings group. For example, the user may generate a shared key with another user, and can use this shared key to generate an encrypted group identifier corresponding to this user. However, the user's encrypted group identifier will not have a matching encrypted group identifier if the two users do not correspond to the same ratings group, or if the other user has not yet uploaded his user-rating snapshot to the recommendation server.

Thus, if the system determines at operation 606 that the selected group identifier does not match any encrypted group identifier of any ratings group, the system continues to determine whether there are more encrypted group identifiers in the user-ratings snapshot (operation 610). If so, the system can return to operation 604 to select another encrypted group identifier.

Otherwise, if the system determines at operation 610 that there are no more encrypted group identifiers in the user-ratings snapshot, the system can create a ratings group corresponding to the plurality of encrypted group identifiers of the received user-ratings snapshot (operation 612). For example, the user may be the first user associated with this ratings group to upload the user-ratings snapshot. Thus, the system creates a new ratings group and associates the user's plurality of encrypted group identifiers to the new ratings group. The recommender system can then use these encrypted group identifiers to perform a direct comparison with other users that upload their user-ratings snapshots to the recommender system at a later date.

Generating an Item Recommendation

Figure 7:
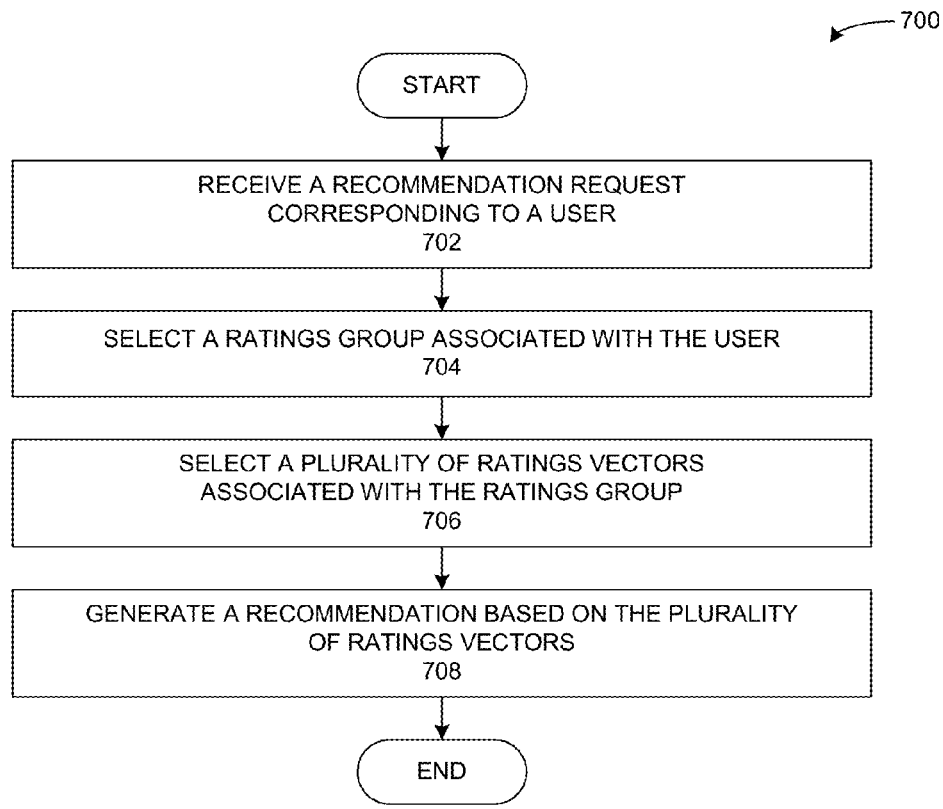
FIG. 7 presents a flow chart illustrating a method for generating an item recommendation for a user in accordance with an embodiment.

FIG. 7 presents a flow chart illustrating a method 700 for generating an item recommendation for a target user in accordance with an embodiment. During operation, the system can receive a recommendation request corresponding to the target user (operation 702). Next, the system can select a ratings group associated with the target user (operation 704), and selects a plurality of ratings vectors associated with the ratings group (operation 706). In some embodiments, the individual ratings vectors are standardized ratings vectors. In some other embodiments, the system can convert each ratings vector (e.g., from a user v for an item i) into a standardized rating vector $\hat{r}_{i,v}$. The system can then generate a recommendation for the user based on the plurality of standardized ratings vectors $\hat{r}_i$ of the ratings group (operation 708).

In some embodiments, during operation 708, the system can generate a predicted rating for one or more items indicated by the recommendation request. In some other embodiments, the system can generate a predicted rating for a plurality of items that the target user has not yet rated, and the system can select one or more items to recommend to the user based on the predicted ratings.

The system can generate a predicted rating for a certain item by first computing the average standardized rating for that item given by the other users in the target user's rating group. The system then generates the predicted rating for this user by adding the target user's average rating to the computed average standardized rating. Hence, the predicted rating $r_{u,i}$ for an item i, targeted to a user u corresponding to a ratings group S, is determined by:

$$r_{u,i} = \bar{r}_u + \frac{1}{|S_i|}\sum_{v \in S_i} \hat{r}_{i,v}$$

$S_i$ indicates a subset of users in S who have provided a rating for the item i, $\bar{r}_u$ indicates the overall average rating for the user u, and $\hat{r}_{i,v}$ indicates a standardized rating for item i from a user v. In some embodiments, the system can compute the average rating value of the ratings group by weighting each rating $\hat{r}_{i,v}$ by a distance between users u and v (e.g., a distance between the standardized ratings vectors for users u and v).

Further, in some embodiments, the system can receive ratings vectors from a subset of users that are less privacy-sensitive and thus willing to reveal their actual (not obfuscated) item ratings. If enough users provide their actual item ratings, the system can generate a recommendation for a user by selecting the actual ratings vectors (e.g., during operation 706), and ignoring the noisy ratings vectors.

Figure 8:
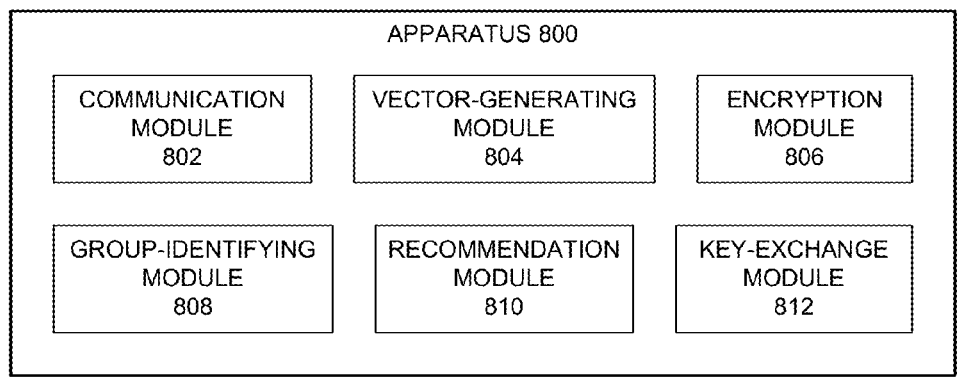
FIG. 8 illustrates an exemplary apparatus that facilitates generating an item recommendation for a user in accordance with an embodiment.

FIG. 8 illustrates an exemplary apparatus 800 that facilitates generating an item recommendation for a user in accordance with an embodiment. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a communication module 802, a vector-generating module 804, an encryption module 806, a group-identifying module 808, a recommendation module 810, and a key-exchange module 812.

In some embodiments, apparatus 800 can realize a client device for a local user. Vector-generating module 804 can generate a standardized ratings vector from a plurality of user-selected ratings, and can generate a noisy ratings vector that includes the plurality of user-selected ratings and a plurality of random-generated ratings. Group-identifying module 808 can compute a group identifier for the local user by processing the standardized ratings vector using a group-identifying hash function. Communication module 802 can send a user-ratings snapshot to a recommendation server, the user-ratings snapshot comprising the group identifier and the noisy ratings vector.

Recommendation module 810 can use communication module 802 to receive a recommendation from the recommendation server for the local user. Key-exchange module 812 can exchange private keys between the local user and a plurality of remote users, and can generate a shared private key based on the exchanged public keys. Encryption module 806 can encrypt the k-bit result from the group-identifying hash function using the private key to produce an encrypted group identifier.

In some embodiments, apparatus 800 can realize a recommendation server. Communication module 802 can receive a user-ratings snapshot from a user's client device. The user-ratings snapshot can include a first group identifier for a first user and a first ratings vector for the first user. Group-identifying module 808 can determine a ratings group for the first user based on the group identifier, and can associate the first ratings vector to the ratings group. Communication module 802 can also receive a recommendation request indicating a second group identifier for a second user. Recommendation module 810 can determine a plurality of ratings vectors associated with the ratings group, and can generate a recommendation based on the plurality of ratings vectors.

Figure 9:
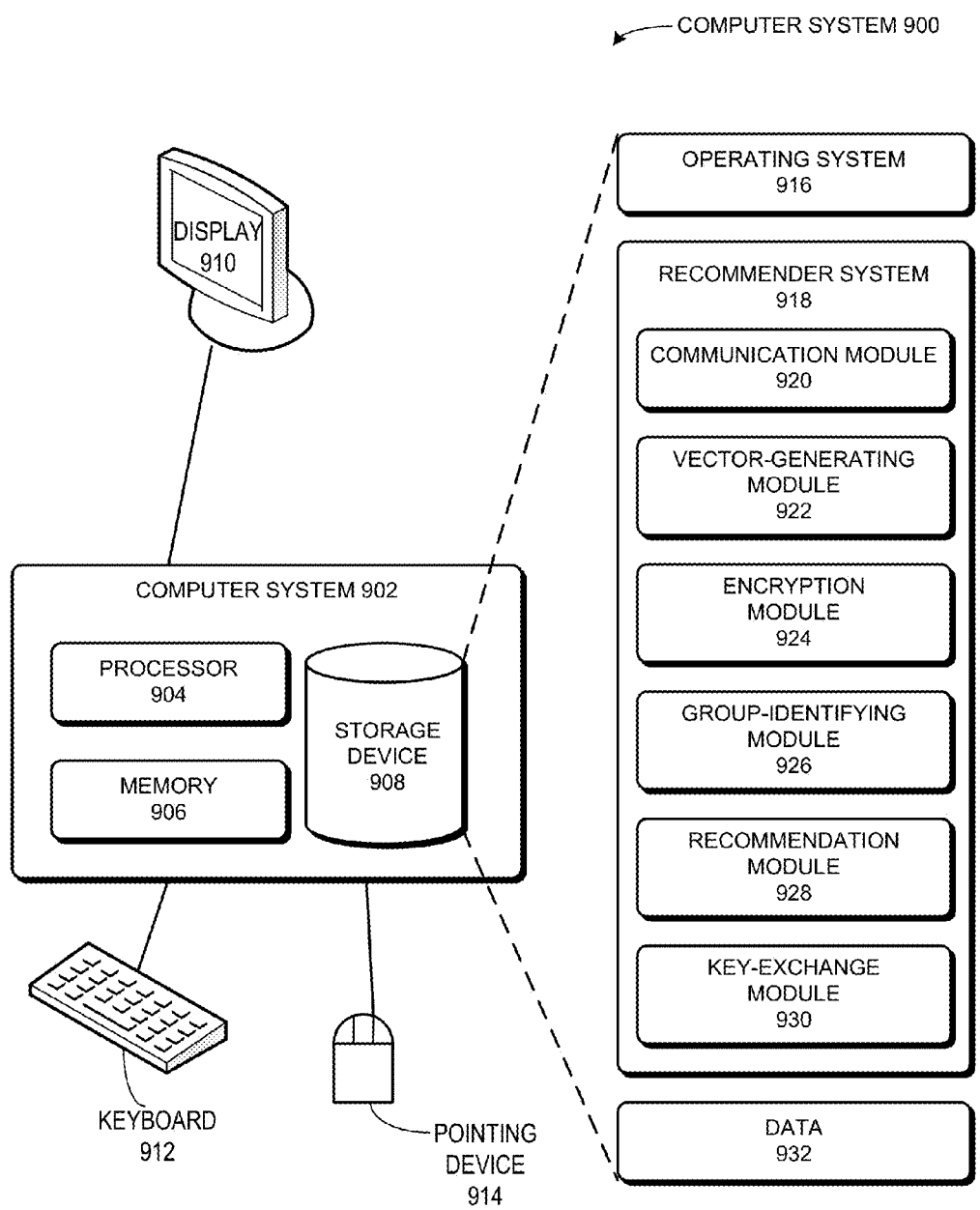
FIG. 9 illustrates an exemplary computer system that facilitates generating an item recommendation for a user in accordance with an embodiment.

FIG. 9 illustrates an exemplary computer system 902 that facilitates generating an item recommendation for a user in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store operating system 916, recommender system 918, and data 932.

Recommender system 918 can include instructions, which when executed by computer system 902, can cause computer system 902 to perform methods and/or processes described in this disclosure. Specifically, computer system 902 can realize a client computing device for a local user. Recommender system 918 may include instructions for generating a standardized ratings vector from a plurality of user-selected ratings, and generating a noisy ratings vector that includes the plurality of user-selected ratings and a plurality of random-generated ratings (vector-generating module 922). Further, recommender system 918 can include instructions for computing a group identifier for the local user by processing the standardized ratings vector using a group-identifying hash function (group-identifying module 926). Recommender system 918 can also include instructions for sending a user-ratings snapshot to a recommendation server, the user-ratings snapshot comprising the group identifier and the noisy ratings vector (communication module 920).

Recommender system 918 can also include instructions for obtaining a recommendation from the recommendation server for the local user (recommendation module 928). Further, recommender system 918 can include instructions for exchanging private keys between the local user and a plurality of remote users, and generating a shared private key based on the exchanged public keys (key-exchange module 930). Recommender system 918 can also include instructions for encrypting the k-bit result from the group-identifying hash function using the private key to produce an encrypted group identifier (encryption module 924).

In some embodiments, computer system 902 can realize a recommender server. Recommender system 918 may include instructions for receiving a user-ratings snapshot from a user's client device (communication module 920). The user-ratings snapshot can include a first group identifier for a first user and a first ratings vector for the first user. Further, recommender system 918 can include instructions for determining a ratings group for the first user based on the group identifier, and associating the first ratings vector to the ratings group (group-identifying module 926).

Recommender system 918 can also include instructions for receiving a recommendation request indicating a second group identifier for a second user (communication module 920). Further, recommender system 918 can include instructions for determining a plurality of ratings vectors associated with the ratings group, and for generating a recommendation based on the plurality of ratings vectors (recommendation module 928).

Data 932 can include any data that is required as input or that is generated as output by the methods and/or processes described in this disclosure. Specifically, data 932 can store at least a group-identifying hash function, a plurality of ratings vectors, group identifiers, public keys for a plurality of users, and a private key for a local user.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
receiving a user-ratings snapshot, wherein the user-ratings snapshot comprises a first group identifier for a first end-user and a first ratings vector for the first end-user, and wherein the ratings vector indicates a rating value for each of a plurality of rated items;
associating the first ratings vector to a ratings group identified by the first group identifier;
receiving a recommendation request indicating a second group identifier for a second end-user, wherein the second group identifier identifies the ratings group;
determining a plurality of ratings vectors associated with the ratings group; and
generating, by a computing device, a recommendation based on the plurality of ratings vectors, wherein generating the recommendation involves:
determining, from the plurality of ratings vectors, a corresponding plurality of standardized ratings for a rated item of one or more rated items, wherein a standardized rating from a respective end-user is standardized based on a rating average for the respective end-user;
computing a standardized average rating for the rated item by computing the average for the plurality of standardized ratings;
computing an average rating for the rated item by adding the second end-user's average rating to the standardized average rating; and
selecting an item that has the highest average rating among the one or more rated items.

2. The method of claim 1, wherein the ratings group is identified by a plurality of encrypted group identifiers,
wherein the first and second group identifiers each comprise a group identifier which has been encrypted using a shared key corresponding to the first and second users, and
wherein the method further comprises determining that the second end-user is associated with the ratings group by determining that the second group identifier matches at least the first group identifier.

3. The method of claim 1, further comprising:
responsive to determining that the first group identifier for the first end-user does not match a group identifier of an existing ratings group:
creating a ratings group corresponding to the first group identifier; and
associating the ratings group with the first group identifier.

4. The method of claim 1, further comprising:
generating a group-identifying hash function; and
sending the group-identifying hash function to a plurality of entities.

5. The method of claim 4, wherein generating the group-identifying hash function involves:
generating a set of k random vectors, wherein a respective vector includes m random values, and wherein the respective random vector is orthogonal to other random vectors in the set;
normalizing the random vectors in the set to produce unit-length random vectors; and
generating the group-identifying hash function based on the set of k unit-length random vectors, wherein the group-identifying hash function maps an m-dimensional ratings vector into a k-bit string.

6. The method of claim 5, wherein a respective unit-length random vector includes vector elements with a magnitude less than or equal to a predetermined upper bound.

7. A non-transitory computer-readable storage medium storing instructions that when executed by a computer cause the computer to perform a method, the method comprising:
receiving a user-ratings snapshot, wherein the user-ratings snapshot comprises a first group identifier for a first end-user and a first ratings vector for the first end-user, and wherein the ratings vector indicates a rating value for each of a plurality of rated items;
associating the first ratings vector to a ratings group identified by the first group identifier;
receiving a recommendation request indicating a second group identifier for a second end-user, wherein the second group identifier identifies the ratings group;
determining a plurality of ratings vectors associated with the ratings group; and
generating a recommendation based on the plurality of ratings vectors, wherein generating the recommendation involves:
determining, from the plurality of ratings vectors, a corresponding plurality of standardized ratings for a rated item of one or more rated items, wherein a standardized rating from a respective end-user is standardized based on a rating average for the respective end-user;
computing a standardized average rating for the rated item by computing the average for the plurality of standardized ratings;
computing an average rating for the rated item by adding the second end-user's average rating to the standardized average rating; and
selecting an item that has the highest average rating among the one or more rated items.

8. The storage medium of claim 7, wherein the ratings group is identified by a plurality of encrypted group identifiers,
wherein the first and second group identifiers each comprise a group identifier which has been encrypted using a shared key corresponding to the first and second users, and
wherein the method further comprises determining that the second end-user is associated with the ratings group by determining that the second group identifier matches at least the first group identifier.

9. The storage medium of claim 7, further comprising:
responsive to determining that the first group identifier for the first end-user does not match a group identifier of an existing ratings group:
creating a ratings group corresponding to the first group identifier; and
associating the ratings group with the first group identifier.

10. The storage medium of claim 7, further comprising:
generating a group-identifying hash function; and
sending the group-identifying hash function to a plurality of entities.

11. The storage medium of claim 10, wherein generating the group-identifying hash function involves:
generating a set of k random vectors, wherein a respective vector includes m random values, and wherein the respective random vector is orthogonal to other random vectors in the set;
normalizing the random vectors in the set to produce unit-length random vectors; and generating the group-identifying hash function based on the set of k unit-length random vectors, wherein the group-identifying hash function maps an m-dimensional ratings vector into a k-bit string.

12. The storage medium of claim 11, wherein a respective unit-length random vector includes vector elements with a magnitude less than or equal to a predetermined upper bound.

13. An apparatus comprising:
a processor;
a memory;
a communication module to receive a user-ratings snapshot, wherein the user-ratings snapshot comprises a first group identifier for a first end-user and a first ratings vector for the first end-user, and wherein the ratings vector indicates a rating value for each of a plurality of rated items;
a group-identifying module to associate the first ratings vector to a ratings group identified by the first group identifier; and
a recommendation module to generate a recommendation based on the ratings group,
wherein the communication module is further configured to receive a recommendation request indicating a second group identifier for a second end-user, wherein the second group identifier identifies the ratings group, and
wherein the recommendation module is further configured to:
determine a plurality of ratings vectors associated with the ratings group; and
generate a recommendation based on the plurality of ratings vectors, and
wherein while generating the recommendation, the recommendation module is further configured to:
determine, from the plurality of ratings vectors, a corresponding plurality of standardized ratings for a rated item of one or more rated items, wherein a standardized rating from a respective end-user is standardized based on a rating average for the respective end-user;
compute a standardized average rating for the rated item by computing the average for the plurality of standardized ratings;
compute an average rating for the rated item by adding the second end-user's average rating to the standardized average rating; and
select an item that has the highest average rating among the one or more rated items.

14. The apparatus of claim 13, wherein the ratings group is identified by a plurality of encrypted group identifiers,
wherein the first and second group identifiers each comprise a group identifier which has been encrypted using a shared key corresponding to the first and second users, and
wherein the group-identifying module is further configured to determine that the second end-user is associated with the ratings group by determining that the second group identifier matches at least the first group identifier.

15. The apparatus of claim 13, wherein responsive to determining that the first group identifier for the first end-user does not match a group identifier of an existing ratings group, the group-identifying module is further configured to:
create a ratings group corresponding to the first group identifier; and
associate the ratings group with the first group identifier.

16. The apparatus of claim 13, wherein the recommendation module is further configured to:
generate a group-identifying hash function; and
send the group-identifying hash function to a plurality of entities.

17. The apparatus of claim 16, wherein while generating the group-identifying hash function the recommendation module is further configured to:
generate a set of k random vectors, wherein a respective vector includes m random values, and wherein the respective random vector is orthogonal to other random vectors in the set;
normalize the random vectors in the set to produce unit-length random vectors; and
generate the group-identifying hash function based on the set of k unit-length random vectors, wherein the group-identifying hash function maps an m-dimensional ratings vector into a k-bit string.

18. The apparatus of claim 17, wherein a respective random vector includes vector elements with a magnitude less than or equal to a predetermined upper bound.

* * * * *